United States Patent
Ao

(10) Patent No.: US 9,871,737 B2
(45) Date of Patent: Jan. 16, 2018

(54) METHOD, DEVICE AND SYSTEM FOR BIDIRECTIONAL FLOW ON SAME PATH IN AGGREGATION GROUP

(71) Applicant: ZTE Corporation, Shenzhen (CN)

(72) Inventor: Ting Ao, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 107 days.

(21) Appl. No.: 14/437,055

(22) PCT Filed: Sep. 27, 2013

(86) PCT No.: PCT/CN2013/084470
§ 371 (c)(1),
(2) Date: Jun. 3, 2015

(87) PCT Pub. No.: WO2014/059871
PCT Pub. Date: Apr. 24, 2014

(65) Prior Publication Data
US 2015/0271088 A1    Sep. 24, 2015

(30) Foreign Application Priority Data
Oct. 19, 2012  (CN) .......................... 2012 1 0401024

(51) Int. Cl.
*G01R 31/08*      (2006.01)
*H04L 12/891*     (2013.01)
(Continued)

(52) U.S. Cl.
CPC ............... *H04L 47/41* (2013.01); *H04L 5/14* (2013.01); *H04L 47/125* (2013.01); *Y02B 60/33* (2013.01)

(58) Field of Classification Search
CPC ............................ H04L 47/125; H04W 72/10
(Continued)

(56) References Cited

U.S. PATENT DOCUMENTS

| | | | |
|---|---|---|---|
| 7,864,818 B2 * | 1/2011 | Fong ....................... | H04L 45/00 370/536 |
| 2008/0112323 A1 * | 5/2008 | Agmon ............... | H04L 12/4641 370/235 |

(Continued)

FOREIGN PATENT DOCUMENTS

| CN | 101022456 A | 8/2008 |
|---|---|---|
| CN | 102447621 A | 5/2012 |

OTHER PUBLICATIONS

International Search Report for corresponding application PCT/CN2013/084470 filed Sep. 27, 2013; Filed Jan. 9, 2014.
(Continued)

*Primary Examiner* — Iqbal Zaidi
(74) *Attorney, Agent, or Firm* — Cantor Colburn LLP

(57) ABSTRACT

A method, device and system for implementing bidirectional traffic on the same path in an aggregation group are provided, wherein the method includes that a portal of an LAG receives indication information sent by an opposite end of the LAG, wherein the indication information carries port indexes of the opposite end and/or a traffic distribution method of the opposite end; the portal determines port indexes of the portal and/or traffic distribution method of the portal according to the indication information; the portal distributes traffic according to the determined port indexes and/or traffic distribution method The disclosure solves a technical problem in the prior art that port protection cannot be implemented due to the inability to ensure that traffic of the same service can be transmitted on the same aggregation link, thus effectively ensuring that the same service selects the same aggregation link bi-directionally on two ends of an aggregation group and implementing the technical effect of protection on an interconnect port.

18 Claims, 3 Drawing Sheets

(51) Int. Cl.
*H04L 12/803* (2013.01)
*H04L 5/14* (2006.01)
(58) Field of Classification Search
USPC .................................................. 370/235–409
See application file for complete search history.

(56) References Cited

U.S. PATENT DOCUMENTS

| 2012/0182872 | A1 | 7/2012 | Wakumoto |
| 2012/0236859 | A1 | 9/2012 | Subramanian |
| 2012/0281541 | A1 | 11/2012 | Palmer |
| 2012/0327941 | A1* | 12/2012 | Villamizar .............. H04L 47/41 370/394 |

OTHER PUBLICATIONS

European Search Report for corresponding application EP 13 84 7564; Report dated Aug. 25, 2015.

* cited by examiner

METHOD, DEVICE AND SYSTEM FOR BIDIRECTIONAL FLOW ON SAME PATH IN AGGREGATION GROUP

TECHNICAL FIELD

The embodiments of the disclosure relates to the communication field, and particularly to a method, device, and system for implementing bidirectional traffic on the same path in an aggregation group.

BACKGROUND

With the rapid development of broadband services, interconnection between networks is used more and more to carry more services by the networks. One or more links and one or more nodes thereon in a network may be protected by various methods according to a technology applied by the network. With growing demands and increasing requirements for traffic protection, some operators also need to protect network interconnection. Preferably, the protection herein may be implemented by port aggregation. A common method may be port aggregation or link aggregation, and may be also loop protection. In link aggregation, a common method at present is port aggregation on one node, thus link aggregation can be only applied to link protection and protection required for a node on a network edge interface can be hardly implemented through the current link aggregation technology.

Therefore, it is proposed by the Institute of Electrical and Electronics Engineers (IEEE) standards organization to extend link aggregation to meet a requirement of increasingly diverse networking modes of a network interconnect area, and implement not only protection for a link, but also protection for an edge node. That is, a demand for network interconnecting protection with dual redundancy of links and nodes is implemented through a distributed Link Aggregation Group (LAG), i.e. a Distributed Resilient Network Interconnect (DRNI). That is, a portal of an aggregation group is formed by a plurality of nodes, and links formed by aggregating the plurality of nodes are aggregated to form an LAG. As shown in FIG. 1, two portals A and B of an LAG are both provided with two nodes. Portal A corresponds to System 1 and System 2 and Portal B corresponds to System 3 and System 4. A plurality of links of these four systems are aggregated to form an LAG. Dual protection of links and nodes may be implemented through such a distributed LAG. Here, System 1 and System 2 in Portal A communicate through an internal link, while System 3 and System 4 of Portal B also communicate through an internal link.

Currently, the DRNI implements protection and sharing for a load through distinguishing message services. However, it can be hardly ensured that traffic of the same service can be transmitted on the same aggregation link, because the traffic needs to be distributed by two ends respectively. The method for distributing traffic is contradictory to application of the DRNI in protection of a network interface and inconsistent with a demand of the Metro Ethernet Forum (MEF) for protecting a network interface. For protection, it is expected that a packet switching network is able to simulate Time Division Multiplex (TDM) to realize a kind of point-to-point service protection, and services affected by switching on a fault can be reduced as many as possible, i.e. switching of services is affected as little as possible.

Therefore, a feasible and effective method needs to be found in order to ensure that the same service is bidirectional on the same path when transmitted on DRNI.

At present, there is no effective solution for the problem above.

SUMMARY

Embodiments of the disclosure provide a method, device and system for implementing bidirectional traffic on the same path in an aggregation group to at least solve a technical problem in the prior art that port protection cannot be implemented due to the inability to ensure that traffic of the same service can be transmitted on the same aggregation link.

A method for implementing bidirectional traffic on the same path in an aggregation group is provided according to an aspect of the embodiments of the disclosure, including that a portal of an LAG receives indication information sent by an opposite end of the LAG, wherein the indication information carries port indexes of the opposite end and/or a traffic distribution method of the opposite end; the portal determines port indexes of the portal and/or traffic distribution method of the portal according to the indication information; the portal distributes traffic according to the determined port indexes and/or traffic distribution method.

In the described embodiment, the port indexes carried in the indication information are sequencing numbers of aggregation ports corresponding to links sending the indication information.

In the described embodiment, the portal determines the port indexes of the portal and/or the traffic distribution method of the portal according to the indication information includes that the portal determines port indexes of the portal and/or traffic distribution method according to the received indication information based on a predetermined strategy.

In the described embodiment, the portal determines port indexes of the portal according to the received indication information based on the predetermined strategy includes that when the port indexes of the opposite end carried in the indication information are inconsistent with the port indexes of the portal itself, the portal sets the port indexes of the portal according to priorities of the portal and the opposite end or a master-slave relation between the portal and the opposite end.

In the described embodiment, the portal sets the port indexes of the portal according to the priorities of the portal and the opposite end includes that when the priority of the opposite end is higher than the priority of the portal, the portal modifies the port indexes of the portal into the port indexes of the opposite end; or the portal sets the port indexes of the portal according to the master-slave relation between the portal and the opposite end includes that when the opposite end is a master device, the portal modifies the port indexes of the portal into the port indexes of the opposite end.

In the described embodiment, the portal determines the traffic distribution method according to the received indication information based on the predetermined strategy includes that when the traffic distribution method of the opposite end carried in the indication information is inconsistent with the traffic distribution method of the portal, the portal sets the traffic distribution method according to priorities of the portal and the opposite end or a master-slave relation between the portal and the opposite end.

In the described embodiment, the portal sets the traffic distribution method of the portal according to the priorities of the portal and the opposite end comprises includes that when the priority of the opposite end is higher than the priority of the portal, the portal modifies the traffic distribution method of the portal into the traffic distribution method of the opposite end; or the portal sets the traffic distribution method according to the master-slave relation between the portal and the opposite end includes that when the opposite end is a master device, the portal modifies the traffic distribution method of the portal into the traffic distribution method of the opposite end.

In the described embodiment, the portal modifies the traffic distribution method of the portal into the traffic distribution method of the opposite end includes that the portal determines whether the portal itself supports the traffic distribution method selected by the opposite end and carried in the indication information; when the portal itself supports the traffic distribution method selected by the opposite end and carried in the indication information, the portal modifies, according to the indication information, the traffic distribution method of the portal into the traffic distribution method selected by the opposite end; when the portal itself does not support the traffic distribution method selected by the opposite end and carried in the indication information, the portal sends alarm information for indicating a negotiation failure.

In the described embodiment, the portal determines the port indexes of the portal, and/or the traffic distribution method of the portal according to the indication information includes that the portal sets the port indexes of the portal and/or the traffic distribution method to be consistent with the port indexes of the opposite end and/or the traffic distribution method selected by the opposite end and carried in the received indication information.

In the described embodiment, the portal determines the port indexes of the portal and/or the traffic distribution method of the portal includes that the portal establishes a mapping relation between ports receiving the indication information and the port indexes carried in the indication information; the portal distributes the traffic according to the determined port indexes includes that the portal distributes the traffic according to the mapping relation.

In the described embodiment, the traffic distribution method includes: a traffic distribution algorithm and/or a tuple participating in the traffic distribution algorithm.

In the described embodiment, in a case that the traffic distribution method is the traffic distribution algorithm and the tuple participating in the traffic distribution algorithm, after the portal sets the traffic distribution method of the portal according to the received indication information based on the predetermined strategy, the method further includes that the portal performs calculation according to the traffic distribution method and/or the tuple selection algorithm and the port indexes, to determine aggregation links selected when data streams are distributed.

In the described embodiment, the traffic distribution algorithm includes at least one of the followings: a traditional quintuple distribution algorithm; a distribution algorithm according a service; a distribution algorithm according to a source Media Access Control (MAC) address and a target MAC address; a distribution algorithm according to a source Internet Protocol (IP) address and a target IP address; and a distribution algorithm according to a source port ID, a target port ID, a source IP address and a target IP address.

In the described embodiment, the service includes at least one of the following IDs: a Custom Virtual Local Area Network (VLAN) ID (C-VID), a Service VLAN ID (S-VID), a Backbone VLAN ID (B-VID) and a Backbone Service Instance ID (I-SID).

In the described embodiment, a system predefines one code for each traffic distribution algorithm, wherein the code is in a one-to-one corresponding relation with the traffic distribution method.

In the described embodiment, the tuple performing the traffic distribution algorithm includes at least one of the followings: a source MAC address and a target MAC address; a type of a target address; a protocol type ID; information of a higher layer protocol; a service ID of a data stream; a source IP address and a target IP address; and a source port ID and a target port ID.

In the described embodiment, the system predefines a string of bits, wherein each bit in the string of bits corresponds to one tuple performing the traffic distribution algorithm.

In the described embodiment, the indication information is carried through a Type Length Value (TLV) message transmitted between the portal and the opposite end.

A device for implementing bidirectional traffic on the same path in an aggregation group is provided according to another aspect of the embodiments of the disclosure, located in a portal of an LAG and including: a receiving unit, configured to receive indication information sent by an opposite end of the LAG, wherein the indication information carries port indexes of the opposite end and/or a traffic distribution method of the opposite end; a determining unit, configured to determine port indexes of the portal and/or traffic distribution method of the portal according to the indication information; a distributing unit, configured to distribute traffic according to the determined port indexes and/or traffic distribution method.

In the described embodiment, the determining unit is further configured to set, in a case that the port index of the opposite end carried in the indication information are inconsistent with the port indexes of the portal, the port indexes of the portal according to the priority of the portal and the priority of the opposite end or a master-slave relation with the opposite end.

In the described embodiment, the determining unit is further configured to set the port indexes of the portal and/or the traffic distribution method of the portal to be consistent with the port index of the opposite end and/or the traffic distribution method selected by the opposite end and carried in the received indication information.

A device for implementing bidirectional traffic on the same path in an aggregation group is provided according to still another aspect of the embodiments of the disclosure, located in a portal of an LAG and including: a sending unit, configured to send indication information to an opposite end of the LAG, wherein the indication information carries port indexes of the local end and/or a traffic distribution method of the opposite end; and the indication information is used for determining, for the opposite end, port indexes of the opposite end and/or the traffic distribution method of the opposite end; a distributing unit, configured to distribute traffic with the opposite end.

A system for implementing bidirectional traffic on the same path in an aggregation group is provided according to still another aspect of the embodiments of the disclosure, including a portal provided with the device for implementing bidirectional traffic on the same path in an aggregation group and a portal provided with the device for implementing bidirectional traffic on the same path in an aggregation group.

In the embodiments of the disclosure, two ends of an LAG may determine, through the port indexes and a traffic distribution method of an opposite end carried in indication information, port indexes and/or a traffic distribution method finally applied during traffic distribution. So the same traffic distribution method and port indexes may be used by two ends of the LAG to solve a technical problem in the prior art that port protection cannot be implemented due to the inability to ensure that traffic of the same service can be transmitted on the same aggregation link, thus effectively ensuring that the same service selects the same aggregation link bi-directionally on two ends of an aggregation group and implementing the technical effect of protection on an interconnect port.

BRIEF DESCRIPTION OF THE DRAWINGS

The accompanying drawings illustrated here are used for providing further understanding to the disclosure and constitute a part of the application. The exemplary embodiments of the disclosure and the illustration thereof are used for explaining the disclosure, instead of constituting an improper limitation to the disclosure. In the accompanying drawings.

DETAILED DESCRIPTION OF THE EMBODIMENTS

The disclosure will be described in details hereinafter with reference to the accompanying drawings and in conjunction with the embodiments. It should be noted that, if there is no conflict, the embodiments in the application and the characteristics in the embodiments may be combined with each other.

Figure 1:
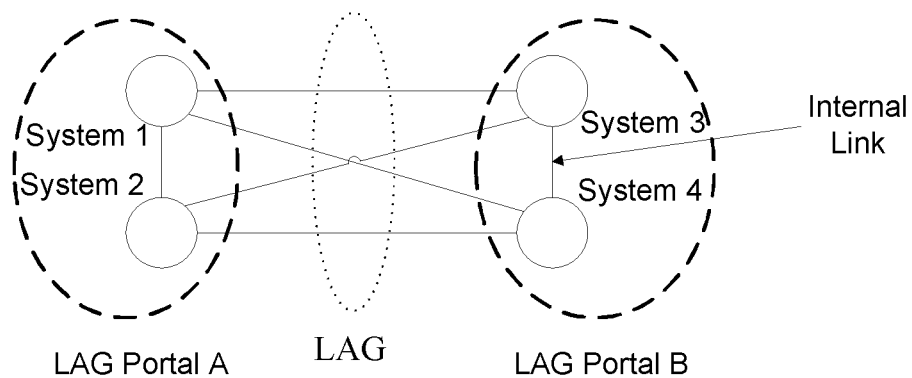
FIG. 1 is a schematic diagram of an LAG according to the prior art.
Figure 2:
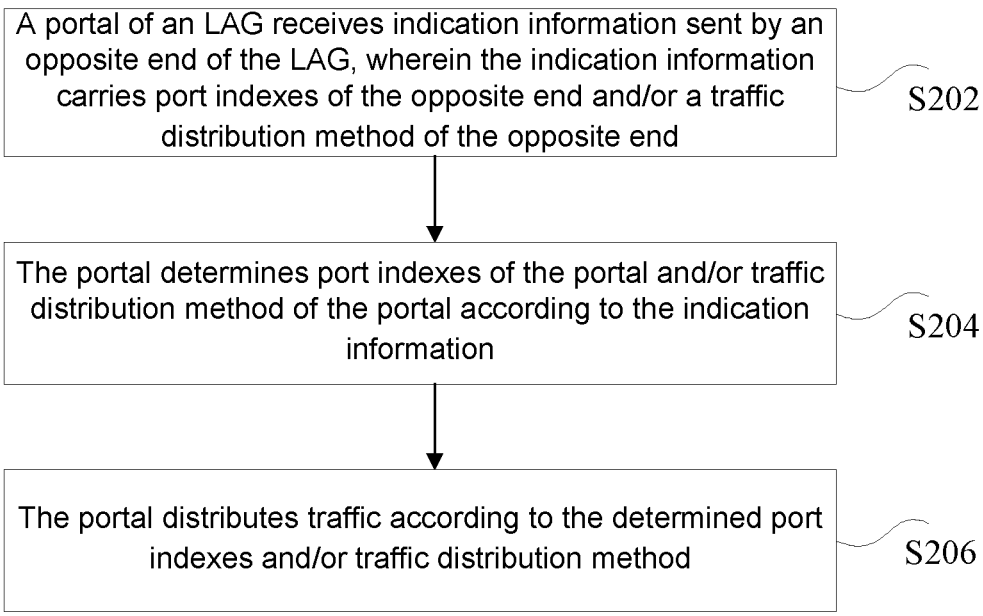
FIG. 2 is an example flowchart of a method for implementing bidirectional traffic on the same path in an aggregation group according to an embodiment of the disclosure.

An embodiment of the disclosure provides an example method for implementing bidirectional traffic on the same path in an aggregation group. As shown in FIG. 2, the method includes the following steps.

Step 202: A portal of an LAG receives indication information sent by an opposite end of the LAG, wherein the indication information carries port indexes of the opposite end and/or a traffic distribution method of the opposite end.

Step 204: The portal determines port indexes of the portal and/or traffic distribution method of the portal according to the indication information.

Step 206: The portal distributes traffic according to the determined port indexes and/or traffic distribution method.

In the example embodiment above, two ends of the LAG may determine, through the port indexes and the traffic distribution method of the opposite end carried in the indication information, port indexes and/or a traffic distribution method finally applied during traffic distribution, thus the same traffic distribution method and port indexes may be used by the two ends of the LAG to solve a technical problem in the prior art that port protection cannot be implemented due to the inability to ensure that traffic of the same service can be transmitted on the same aggregation link, thus effectively ensuring that the same service selects the same aggregation link bi-directionally on two ends of an aggregation group and implementing the technical effect of protection on an interconnect port.

The port indexes carried in the indication information may be sequencing numbers of aggregation ports corresponding to links sending the indication information, e.g. ports x, y and z may be numbered as 1, 2 and 3 respectively, and 1, 2 and 3 are sequencing numbers corresponding to the ports.

A determining strategy may be predetermined and the same strategy is applied by the two ends of the LAG so that results determined by the two ends are the same. In a example embodiment, the step that the portal determines the port indexes of the portal and/or the traffic distribution method of the portal according to the indication information includes that the portal determines port indexes of the portal and/or traffic distribution method according to the received indication information based on a predetermined strategy.

The strategy may be determining the port index and/or traffic distribution method according to priorities, and may be also determining the port index and/or traffic distribution method according a master-slave relation. In a example embodiment, the step that the portal determines port indexes of the portal according to the received indication information based on the predetermined strategy includes that when the port indexes of the opposite end carried in the indication information are inconsistent with the port indexes of the portal itself, the portal sets the port indexes of the portal according to priorities of the portal and the opposite end or a master-slave relation between the portal and the opposite end.

These two predetermined strategies will be described in details below.

1) In Accordance with the Priorities

When the port indexes are determined, the portal modifies port indexes of the portal into that of the opposite end when the priority of the opposite end is higher than the priority of the portal.

When the traffic distribution method is determined, the portal modifies its own traffic distribution method into that of the opposite end when the priority of the opposite end is higher than the priority of the portal.

2) In Accordance with the Master-Slave Relation

When the port indexes are determined, the portal modifies port indexes of the portal into that of the opposite end when the opposite end is a master device.

When the traffic distribution method is determined, the portal modifies its own traffic distribution method into that of the opposite end when the opposite end is a master device.

In the described embodiment, the step that the portal modifies its own traffic distribution method into that of the opposite end may further include that the portal determines whether the portal itself supports the traffic distribution method selected by the opposite end and carried in the indication information; if yes, the portal modifies, according to the indication information, its own traffic distribution method into the traffic distribution method selected by the opposite end; otherwise, the portal sends alarm information for indicating a negotiation failure. That is, a local end needs to first determine whether the local end itself supports a traffic distribution method of an opposite end when determining that a traffic distribution method of the local end needs to be modified into that of the opposite end. The modification may be made only when the traffic distribution method of the opposite end is supported; otherwise, an error will be reported.

The two ends of the LAG may further determine the final traffic distribution method and/or port indexes by means of notification. That is, when an end receives indication information of an opposite end, it directly sets its own traffic distribution method and/or port indexes according to information carried in the indication information. In a example embodiment, the step that the portal determines its own port indexes and/or traffic distribution method of the portal according to the indication information includes:

the portal sets the port indexes of the portal and/or the traffic distribution method to be consistent with the port indexes of the opposite end and/or the traffic distribution method selected by the opposite end and carried in the received indication information.

In a example embodiment, the step that the portal determines the port indexes of the portal according to the indication information includes that the portal establishes a mapping relation between ports receiving the indication information and the port indexes carried in the indication information; the step that the portal distributes the traffic according to the determined port indexes includes that the portal distributes the traffic according to the mapping relation. That is, when acquiring the port indexes of an opposite end, one end will establish a mapping relation between its own port and the port indexes instead of modifying the port indexes of the portal, thus determining the port indexes of the opposite end of the link.

The traffic distribution method may include, but is not limited to a traffic distribution algorithm and/or a tuple participating in the traffic distribution algorithm.

In a case that the traffic distribution method is the traffic distribution algorithm and the participating in the traffic distribution algorithm, after the portal sets the traffic distribution method of the portal according to the received indication information based on the predetermined strategy, the method further includes that the portal performs calculation according to the traffic distribution method and/or the tuple selection algorithm and the port indexes, to determine aggregation links selected when data streams are distributed. That is, after the traffic distribution algorithm and the tuple participating in the traffic distribution algorithm are determined, certain calculation may be performed according to the two and the port indexes to determine links to distribute the traffic.

In the example embodiments above, the traffic distribution algorithm includes, but is not limited to at least one of the followings:

1) a traditional quintuple distribution algorithm;
2) a distribution algorithm according a service, wherein the service may include, but is not limited to at least one of the followings: a C-VID, an S-VID a B-VID and an I-SID;
3) a distribution algorithm according to a source MAC address and a target MAC address;
4) a distribution algorithm according to a source IP address and a target IP address; and
5) a distribution algorithm according to a source port ID, a target port ID, a source IP address and a target IP address.

In the described embodiment, a system may predefine one code for each traffic distribution algorithm, wherein the code is in a one-to-one corresponding relation with the traffic distribution method. Thus, it is only necessary to carry a corresponding code in the indication information, which can be implemented simply.

In the described embodiment, the tuple performing the traffic distribution algorithm includes, but is noted limited to at least one of the followings: a source MAC address and a target MAC address; a type of a target address; a protocol type ID; information of a higher layer protocol; a service ID of a data stream; a source IP address and a target IP address; and a source port ID and a target port ID.

The system may predefine a string of bits, wherein each bit in the string of bits corresponds to one tuple performing the traffic distribution algorithm, e.g. a location corresponding to an applied tuple is set as 1.

In the example embodiments above, the indication information may be carried through a TLV message transmitted between the portal and the opposite end, wherein the TLV message has a variable format, and TLV means Type, Length and Value.

Figure 3:
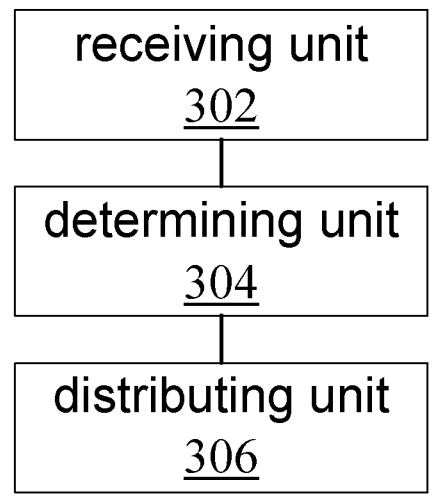
FIG. 3 is an example structure block diagram of a device for implementing bidirectional traffic on the same path in an aggregation group according to an embodiment of the disclosure.

A device for implementing bidirectional traffic on the same path in an aggregation group is further provided in the embodiment, located in a portal of an LAG. The device, which is configured to implement the embodiment above and the example embodiments, has been described and will not be repeated. As used below, term "unit" or "module" may implement a combination of software and/or hardware having a predetermined function. Although devices described in the following embodiments may be preferably implemented by software, it is also possible and conceivable to use hardware or a combination of software and hardware. FIG. 3 is an example structure block diagram of a device for implementing bidirectional traffic on the same path in an aggregation group according to an embodiment of the disclosure. As shown in FIG. 3, the device includes: a receiving unit 302, a determining unit 304 and a distributing unit 306 and the structure of the device will be described below.

The receiving unit 302 is configured to receive indication information sent by an opposite end of the LAG, wherein the indication information carries port indexes of the opposite end and/or a traffic distribution method of the opposite end.

The determining unit 304 is coupled to the receiving unit 302 and configured to determine port indexes of the portal and/or traffic distribution method of the portal according to the indication information.

The distributing unit 306 is coupled to the determining unit 304 and configured to distribute traffic according to the determined port indexes and/or traffic distribution method.

In a example embodiment, the determining unit is further configured to set, in a case that the port index of the opposite end carried in the indication information are inconsistent with the port indexes of the portal, the port indexes of the portal according to the priority of the portal and the priority of the opposite end or a master-slave relation with the opposite end.

In a example embodiment, the determining unit is further configured to set the port indexes of the portal and/or the traffic distribution method of the portal to be consistent with the port index of the opposite end and/or the traffic distribution method selected by the opposite end and carried in the received indication information.

Figure 4:
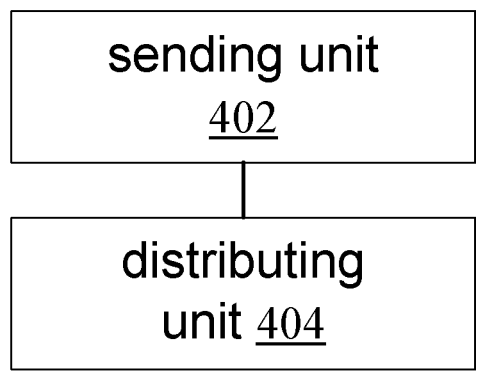
FIG. 4 is another example structure block diagram of a device for implementing bidirectional traffic on the same path in an aggregation group according to an embodiment of the disclosure.

An embodiment of the disclosure further provides an example device for implementing bidirectional traffic on the same path in an aggregation group. As shown in FIG. 4, the device includes a sending unit 402 and a distributing unit 404, wherein the sending unit 402 is configured to send indication information to an opposite end of the LAG, wherein the indication information carries port indexes of the local end and/or a traffic distribution method of the opposite end; and the indication information is configured to determine, by the opposite end, port indexes of the portal and/or traffic distribution method; the distributing unit 404 is configured to distribute traffic with the opposite end.

In the described embodiment, each portal in the LAG may include the devices as shown in FIG. 3 and FIG. 4 simultaneously.

An embodiment of the disclosure further provides a system for implementing bidirectional traffic on the same path in an aggregation group, including the portal above.

The method for distributing traffic of an aggregation group according to the embodiment of the disclosure will be described below in combination with the embodiments and accompanying drawings.

In the embodiment, in order to protect a network interconnect area, it is put forward based on a Link Aggregation Control Protocol (LACP) specified in the 802.1AX standard that two ends of an aggregation group perform negotiation so as to unify port indexes and the two ends calculate according to the algorithm respectively to obtain the same aggregation link so as to ensure that traffic of the same service or the same session in an LAG can be bidirectional on the same path. That is, the same aggregation link at two ends of an aggregation group is selected by traffic of the same service or the same session, thus satisfying a demand for protecting network interfaces.

In the embodiment, a TLV field in the LACP may be extended, e.g. a traffic distribution method TLV may be added, and a traffic distribution method applied by a local end, an ID of an algorithm, or a definition form of a stream is carried through the TLV field of traffic distribution method. In addition, each aggregation port sending an LACP message will add in the LACP message a port index endowed by a local end to the local end, and carry the port index in a port index TLV field.

After receiving the traffic distribution method TLV, one end of the aggregation group (i.e. the LAG) will compare the traffic distribution method TLV with its own traffic distribution method. If the methods of the two ends are inconsistent, a traffic distribution method finally applied will be determined according to a certain predetermined strategy, e.g. priorities of system parameters or a master-slave relation. If the priority of a system parameter of the local end is higher, or the local end is a master system device, the distribution method will not be changed. If the priority of a system parameter of the opposite end is higher, or the local end is a slave system device, it is necessary to follow a traffic distribution method of the opposite end. In the described embodiment, when the traffic distribution method of the opposite end is applied, the local end needs to determine whether the traffic distribution method of the opposite end is supported by the local end itself. If yes, the local end modifies its own traffic distribution method into that of the opposite end. Otherwise, the negotiation fails and an error is reported.

Both two ends of the aggregation group will set a port index for each of their own aggregation ports, establish a corresponding relation between the port index and a port ID of the aggregation port, and notify the port index to an opposite end through a port index TLV. The two ends negotiate the port indexes so as to unify port indexes of the two ends at each portal for each aggregation link. When receiving one or more port index TLVs sent by an opposite end, one or more aggregation ports will compare the port index TLVs with its own port index TLVs. If they are different, the one or more aggregation port will determine, according to a certain strategy, e.g. priorities of system parameters or a master-slave relation, whether it is necessary to modify its own port indexes. If the priority of a system parameter of an aggregation group to which the one or more aggregation ports belong is higher, or the local end is a master system device, the aggregation port will not modify port indexes of the portal. If the priority of the system parameter of the aggregation group to which the one or more aggregation ports belong is lower than the priority of a system parameter of the opposite end or the local end is a slave system device, the one or more aggregation ports will modify its own port indexes according to port indexes of the opposite end so as to acquire consistent port indexes. A corresponding relation between the port indexes and port IDs of the aggregation port will be also modified when the port indexes are modified, and a change of the port index will not affect port aggregation.

In the described embodiment, a mapping relation may be set for the port indexes instead of changing the port indexes. That is, after receiving the port indexes of the opposite end through certain links, the local end establishes a mapping relation between the port indexes and its own ports corresponding to the links. Then, traffic can be distributed on the same path directly according to the established mapping relation.

The content above will be described in more details below in conjunction with two specific embodiments.

Embodiment 1

Figure 5:
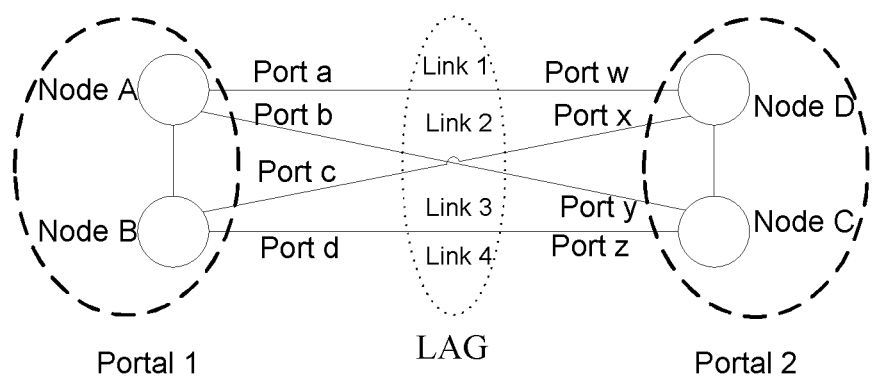
FIG. 5 is an example schematic diagram of an LAG according to an embodiment of the disclosure.

As shown in FIG. 5, two ends of an aggregation group respectively consist of a plurality of nodes. Portal 1 consists of System A and System B while Portal 2 consists of System C and System D, wherein Port a, Port b, Port c and Port d participate in aggregation at Portal 1. Port x, Port y, Port z and Port w participate in aggregation at Portal 2. Port a and Port w are interconnected into Aggregation Link 1, Port b and Port y are interconnected into Aggregation Link 2, Port c and Port x are interconnected into Aggregation link 3, and Port d and Port z are interconnected into Aggregation Link 4. Aggregation Link 1, Aggregation Link 2, Aggregation Link 3 and Aggregation Link 4 form an aggregation group.

In the described embodiment, a group of distribution algorithms are predefined, e.g. existing distribution algorithms mainly include distribution according to a quintuple and distribution according to a service. A format of a traffic distribution method TLV may be as shown in Table 1

TABLE 1

TLV_Type=Distribution algorithm
TLV Length
Distribution Algorithm=01/02/...

In this table, a value of the Distribution Algorithm field is used for indicating a selected session distribution method, e.g. the value may be assigned according to one of the following methods:

Distribution Algorithm=01 indicates that a traditional quintuple is applied as a session distribution algorithm;

Distribution Algorithm=02 indicates that a session distribution algorithm according to a service is applied;

Distribution Algorithm=03 indicates that a session distribution algorithm according to a source MAC address and a target MAC address is applied;

Distribution Algorithm=04 indicates that a session distribution algorithm according to a source IP address and a target IP address is applied;

Distribution Algorithm=05 indicates that a session distribution algorithm according to a source port ID and a target port ID is applied;

Distribution Algorithm=06 indicates that a session distribution algorithm according to a source port ID, a target port ID, a source IP address, and a target IP address is applied; and so on.

After receiving a traffic distribution method TLV, one end of the aggregation group will compare the traffic distribution TLV with its own distribution method. For example, if a distribution method of Portal 1 is a distribution method according to a service while a distribution method of Portal 2 is a distribution algorithm according a quintuple, then according to a predetermined strategy, e.g. priorities of system parameters, the distribution method of Portal 1 will not be changed and Portal 2 needs to follow the distribution method of Portal 1, that is Portal 2 needs to modify its distribution method into distribution according to a service if the priority of a system parameter of Portal 1 is higher. In this example embodiment, Portal 2 needs to determine whether the distribution method of the opposite end is supported by Portal 2 itself. If a system of Portal 2 supports the distribution method of the opposite end, then Portal 2 modifies its own distribution method into the distribution method according to a service. Otherwise, the negotiation fails and an error is reported. The system parameters may be parameters including system priorities or system IDs etc.

System A and System B in Portal 1 determine a port index for each aggregation port through negotiation, and form a corresponding relation between a port ID and a port index of each aggregation port, as shown in Table 2.

TABLE 2

| Port ID | Port Index |
| --- | --- |
| Port a | 001 |
| Port b | 002 |
| Port c | 003 |
| Port d | 004 |

System C and System D in Portal 2 determine a port index for each aggregation port through negotiation, and form a corresponding relation between a port ID and a port index of each aggregation port, as shown in Table 3.

TABLE 3

| Port ID | Port Index |
| --- | --- |
| Port w | 001 |
| Port x | 002 |
| Port y | 003 |
| Port z | 004 |

Figure 6:
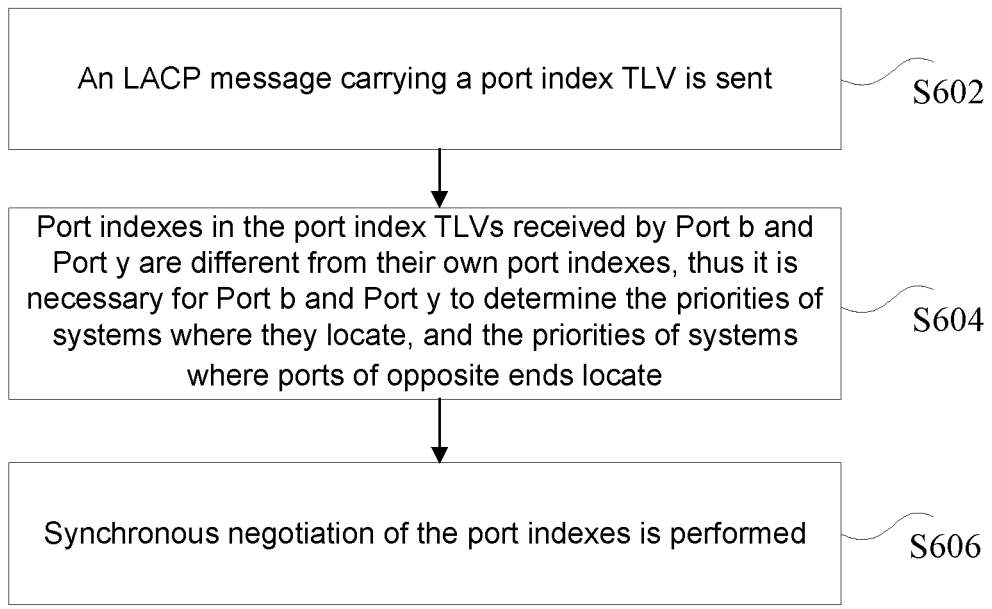
FIG. 6 is an example flowchart of port ID negotiation according to an embodiment of the disclosure.

Based on the corresponding relations, the example embodiment further provides a method for negotiating port indexes, including the following steps as shown in FIG. 6.

Step 602: port indexes are distributed according to the relation tables in Table 2 to Table 3, and each corresponding aggregation port will send an LACP message carrying a port index TLV. A format of the port index TLV is as shown in Table 4.

TABLE 4

TLV_Type=Port Index
TLV Length
Port Index=001/002/...

A port index TLV sent by Port b at one end of Aggregation Link 2 is as shown in Table 5.

TABLE 5

TLV_Type=Port Index
TLV Length
Port Index=002

A port index TLV sent by Port y of an opposite end is as shown in Table 6.

TABLE 6

TLV_Type=Port Index
TLV Length
Port Index=003

Step 604: At the moment, port indexes in the port index TLVs received by Port b and Port y are different from their own port indexes, thus it is necessary for Port b and Port y to determine the priorities of systems where they locate, and the priorities of systems where ports of the opposite end locate.

Step 606: Provided that the priority of a system parameter of Portal 1 is higher than that of a system parameter of Portal 2, or Portal 1 is a master system device while Portal 2 is a slave system device, then after receiving Port Index=002 of Port b, Port y perceives that Port Index=002 is different from that of Port y itself, and will follow the port index of Port b and modify its own port index. Therefore, a port index of Port y is changed into 002 after LACP negotiation, and so forth. After synchronous negotiation of the four ports in the aggregation group, port indexes of Portal 2 are as shown in Table 7.

TABLE 7

| Port ID | Port Index |
| --- | --- |
| Port w | 001 |
| Port x | 003 |
| Port y | 002 |
| Port z | 004 |

It is ensured through the method above that port indexes of aggregation ports on Portal 2 are consistent with port indexes of aggregation ports on Portal 1 on the same aggregation link.

The aggregation group may normally start traffic distribution and transmission only after session distribution algorithms and port indexes become consistent through negotiation (e.g. an aggregator enters a distributing state, and the aggregator starts sending a distribution message only after entering the state).

In this way, it can be ensured through unifying session distribution algorithms and indexes of aggregation ports of the same aggregation link that the aggregation group is able to select traffics of the same session onto the same aggregation link according to a unified session distribution algorithm during traffic distribution, thus ensuring that traffic of the same service or the same session can be distributed on the same path in both directions.

In a example embodiment, one end of an LAG may determine port indexes by establishing a mapping relation instead of by modifying its own port indexes when receiving indication information carrying port indexes from the opposite end. For example, taking an LAG as shown in FIG. 5 as an example, if a port index of Port w, which is received by Port a and sent by the opposite end through Link 1 is 1, a corresponding relation between Port a and 1 may be set at Portal 1. Correspondingly, if it has been preset at Portal 1 that a port index corresponding Port a is 2, such a corresponding relation that Port Index 2 of Portal 1 corresponds to Port Index 1 of the opposite end may be set at the moment. That is, one-to-one correspondence of ports of two ends of a link may be implemented without changing its own port index.

Embodiment 2

In the embodiment, network connection, aggregation of an aggregation group, and negotiation of a port index are consistent with those in Embodiment 1 and a difference is that instead of defining an algorithm for negotiation of two ends, tuples participating in algorithm calculation are defined and traffic of different sessions are distinguished through these tuples in the embodiment.

For example, a tuple TLV may be defined, having a format as shown in Table 8.

TABLE 8

TLV_Type=Tuple in Distribution
TLV Length
Tuple bit where a tuple bit may be 2 or more bytes, which may be determined according to an actual demand, and two bytes are enough at present. More than two bytes may be defined to facilitate extension in the future.

In the embodiment, it is first assumed that the Tuple bit field is 2 bytes, totally consisting of 16 bits. These 16 bits respectively represent different tuples distinguishing traffic definitions and participating in distribution algorithms. In the described embodiment, the bits may be defined as follows from low to high.

1: A source MAC address+a target MAC address;
  2: A target address type (a unicast address/a multi-cast address);
  3: A protocol type ID;
  4: Information of a higher layer protocol (a protocol number of a Logical Link Control (LLC));
  5: A service ID of a data stream;
  6: A source IP address+a target IP address;
  7: A source port ID+a target port ID;
  Bits 8 to 16 are used as reserved bits whose definitions may be extended after negotiation, having a default value of 0.

In the described embodiment, when a traffic needs to be defined through a certain tuple and the tuple needs to participate in calculation of traffic distribution, the bit corresponding to the tuple will be set as 1. Otherwise, the bit is set as 0.

Based on the corresponding relation above, the example embodiment further provides a method for negotiating a tuple, including the following steps:

Step 1: As an example, it is provided that a tuple of Portal 1, which participates in calculation, is a service ID (0000000000010000=0x0010) of a data stream, while a tuple of Portal 2, which participates in calculation, is (0000000000000001=0x0001) determined simultaneously by a target MAC address and a source MAC address (a hardware address), thus a tuple TLV carried in an LACP message sent by an aggregation port of Portal 1 is as shown in Table 9.

TABLE 9

TLV_Type=Tuple in Distribution
TLV Length
Tuple=0x0010

A tuple TLV carried in an LACP message sent by an aggregation port of Portal 2 is as shown in Table 10.

TABLE 10

TLV_Type=Tuple in Distribution
TLV Length
Tuple=0x0001

Step 2: After receiving the tuple TLV of Portal 1, Portal 2 will compare the tuple TLV with its own tuple TLV, and if they are different, Portal 2 needs to determine according to a corresponding strategy, whether it is necessary to modify a tuple selected by Portal 2 itself.

Step 3: It is provided that the determining strategy here refers to system priorities, and the system priority of Portal 1 is higher than that of Portal 2. Therefore, if it is supported by Portal 2 to distribute a service according to a service ID of a data stream, then Portal 2 will modify its own distribution algorithm into distribution according to a service ID of a data stream so as to ensure that tuples for performing a traffic distribution algorithm at two ends of the aggregation group are consistent.

Embodiment 3

The embodiment may be considered as a combination of the two methods in Embodiment 1 and Embodiment 2, which means that a traffic distribution TLV and a tuple TLV are used simultaneously. In the embodiment, the traffic distribution TLV preferably defines some algorithms, such as the followings:

Distribution Algorithm=01 indicates that Distribution Algorithm 1 is applied;
Distribution Algorithm=02 indicates that Distribution Algorithm 2 is applied;
Distribution Algorithm=03 indicates that Distribution Algorithm 3 is applied;
and so forth.

As an input condition of these algorithms, a definition of the tuple TLV is consistent with that in Embodiment 2. Different traffic is distinguished as different sessions through tuples defined in tuple LTVs, thus an aggregation port for distributing the traffic can be selected according to different sessions and different distribution algorithms.

Portal 1 and Portal 2 determine a unified tuple algorithm and a unified distribution algorithm by means of negotiation, and traffic can be distributed after both the tuple and the distribution algorithm are determined. In the described embodiment, when the traffic is distributed at two ends, a unified aggregation link may be calculated through the tuple and the algorithm, thus ensuring that traffic of the same session can be bidirectional on the same path in an aggregation group.

For example, Distribution Algorithm=01 in a traffic distribution method TLV, and Tuple bit=0x0001 in a tuple TLV indicate that a source MAC address and a target MAC address in a message are used as the input of a distribution algorithm to calculate an aggregation link. Finally, Portal 1 and Portal 2 obtain an aggregation port having a port index of 1 through calculation respectively, thus determining the same aggregation link 1.

All the three example embodiments above relate to determination of a traffic distribution method and a port index by means of mutual negotiation of two ends. Then, a notification method may be applied as a example method, i.e. a process of notifying a traffic distribution method and port indexes by one end to the opposite end. The opposite end copies contents of the notification so as to copy the traffic distribution method and the port indexes of the one end as its own traffic distribution method and port indexes, thus unifying the two ends.

A kind of software is further provided in another embodiment. The software is configured to implement the technical solutions described in the embodiments and the example embodiments above.

A storage medium is further provided in another embodiment. The software is stored in the storage medium which includes, but is not limited to an optical disk, a floppy disk, a hard disk, an erasable storage device and so on.

It may be learned from the descriptions above that the following technical effect is implemented by the embodiments of the disclosure: two ends of an LAG may determine, through port indexes and traffic distribution methods of opposite ends in indication information, port indexes and/or a traffic distribution method finally applied during traffic distribution so that two ends of the LAG can use the same traffic distribution method and port index, thus solving a technical problem in the prior art that port protection cannot be implemented due to the inability to ensure that traffic of the same service can be transmitted on the same aggregation link, thus effectively ensuring that the same service selects the same aggregation link bi-directionally on two ends of an aggregation group and implementing the technical effect of protection on an interconnect port.

Evidently, those skilled in the art shall understand that the respective modules or steps of the embodiments of disclosure may be implemented by a general-purpose computing device and may be integrated on a single computing device or distributed over a network consisting of a plurality of computing devices. Optionally, they may be implemented using program codes executable by a computing device so that they may be stored in a storage device and executed by the computing device. In addition, the steps as illustrated or described may be executed according to a sequence different from that described herein in some cases, or they may be implemented by fabricating them into respective integrated circuit modules respectively or by fabricating a plurality of modules or steps of them into a single integrated circuit module. Thus, the disclosure is not limited to any specific combination of hardware and software.

The foregoing descriptions are only example embodiments of the disclosure and are not used for limiting the disclosure. For those skilled in the art, the disclosure may have various alternations and changes. All modifications, equivalent replacements and improvements and the like made within the spirit and principle of the disclosure shall be included within the protection scope of the disclosure.

INDUSTRIAL APPLICABILITY

The technical solutions of the embodiments of the disclosure may be applied to the field of broadband network application, thus solving a technical problem in the prior art that port protection cannot be implemented due to the inability to ensure that traffic of the same service can be transmitted on the same aggregation link, thus effectively ensuring that the same service selects the same aggregation link bi-directionally on two ends of an aggregation group and implementing the technical effect of protection on an interconnect port.

What is claims:

1. A method for implementing bidirectional traffic on the same path in an aggregation group, comprising:
    receiving, by a portal of a Link Aggregation Group, LAG, indication information sent by an opposite end of the LAG, wherein the indication information carries port indexes of the opposite end and/or a traffic distribution method of the opposite end;
    determining, by the Portal, port indexes of the portal and/or a traffic distribution method of the portal according to the indication information;
    distributing, by the portal, traffic according to the determined port indexes and/or traffic distribution method;
    wherein determining, by the portal, the port indexes of the portal according to the received indication information comprises: when the port indexes of the opposite end carried in the indication information are inconsistent with the port indexes of the portal itself, setting, by the portal, the port indexes of the portal according to priorities of the portal and the opposite end or a master-slave relation between the portal and the opposite end.

2. The method according to claim 1, wherein the port indexes carried in the indication information are sequencing numbers of aggregation ports corresponding to links sending the indication information.

3. The method according to claim 1, wherein determining, by the portal, the port indexes of the portal and/or the traffic distribution method of the portal according to the indication information comprises:
    determining, by the portal, the port indexes of the portal and/or the traffic distribution method of the portal according to the received indication information based on a predetermined strategy.

4. The method according to claim 3, wherein determining, by the portal, the traffic distribution method of the portal according to the received indication information based on the predetermined strategy comprises:
    when the traffic distribution method of the opposite end carried in the indication information is inconsistent with the traffic distribution method of the portal, setting, by the portal, the traffic distribution method according to priorities of the portal and the opposite end or a master-slave relation between the portal and the opposite end.

5. The method according to claim 4, wherein
    setting, by the portal, the traffic distribution method of the portal according to the priorities of the portal and the opposite end comprises:
    when the priority of the opposite end is higher than the priority of the portal, modifying, by the portal, the traffic distribution method of the portal into the traffic distribution method of the opposite end; or
    setting, by the portal, the traffic distribution method of the portal according to the master-slave relation between the portal and the opposite end comprises:
    when the opposite end is a master device, modifying, by the portal, the traffic distribution method of the portal into the traffic distribution method of the opposite end.

6. The method according to claim 5, wherein modifying, by the portal, the traffic distribution method of the portal into the traffic distribution method of the opposite end comprises:
determining, by the portal, whether the portal itself supports the traffic distribution method selected by the opposite end and carried in the indication information;
when the portal itself supports the traffic distribution method selected by the opposite end and carried in the indication information, modifying, by the portal according to the indication information, the traffic distribution method of the portal into the traffic distribution method selected by the opposite end; when the portal itself does not support the traffic distribution method selected by the opposite end and carried in the indication information, sending, by the portal, alarm information for indicating a negotiation failure.

7. The method according to claim 1, wherein
setting, by the portal, the port indexes of the portal according to the priorities of the portal and the opposite end comprises:
when the priority of the opposite end is higher than the priority of the portal, modifying, by the portal, the port indexes of the portal into the port indexes of the opposite end; or
setting, by the portal, the port indexes of the portal according to the master-slave relation between the portal and the opposite end comprises:
when the opposite end is a master device, modifying, by the portal, the port indexes of the portal into the port indexes of the opposite end.

8. The method according to claim 1, wherein determining, by the portal, the port indexes of the portal, and/or the traffic distribution method of the portal according to the indication information comprises:
setting, by the portal, the port indexes of the portal and/or the traffic distribution method of the portal to be consistent with the port indexes of the opposite end and/or the traffic distribution method selected by the opposite end and carried in the received indication information.

9. The method according to claim 1, wherein
determining, by the portal, the port indexes of the portal and/or the traffic distribution method of the portal comprises: establishing, by the portal, a mapping relation between ports receiving the indication information and the port indexes carried in the indication information;
distributing, by the portal, the traffic according to the determined port indexes comprises: distributing, by the portal, the traffic according to the mapping relation.

10. The method according to any one of claim 1, wherein the traffic distribution method comprises: a traffic distribution algorithm and/or a tuple selection algorithm.

11. The method according to claim 10, wherein the traffic distribution algorithm comprises at least one of the followings:
a traditional quintuple distribution algorithm;
a distribution algorithm according a service;
a distribution algorithm according to a source Media Access Control, MAC, address and a target MAC address;
a distribution algorithm according to a source Internet Protocol, IP, address and a target IP address; and
a distribution algorithm according to a source port ID, a target port ID, a source IP address and a target IP address;
wherein the service comprises at least one of the following IDs: a Custom Virtual Local Area Network ID, C-VID, a Service VLAN ID, S-VID, a Backbone VLAN ID, B-VID, and a Backbone Service Instance ID, I-SID.

12. The method according to claim 11, wherein a system predefines one code for each traffic distribution algorithm, wherein the code is in a one-to-one corresponding relation with the traffic distribution method.

13. The method according to claim 10, wherein the tuple performing the traffic distribution algorithm comprises at least one of the followings: a source MAC address and a target MAC address; a type of a target address; a protocol type ID; information of a higher layer protocol; a service ID of a data stream; a source IP address and a target IP address; and a source port ID and a target port ID;
wherein the system predefines a string of bits, wherein each bit in the string of bits corresponds to one tuple performing the traffic distribution algorithm.

14. The method according to any one of claim 1, wherein in a case that the traffic distribution method is the traffic distribution algorithm and the tuple selection algorithm, after setting, by the portal, the traffic distribution method of the portal according to the received indication information based on the predetermined strategy, the method further comprises:
performing, by the portal, calculation according to the traffic distribution method and/or the tuple selection algorithm and the port indexes, to determine aggregation links selected when data streams are distributed.

15. The method according to any one of claim 1, wherein the indication information is carried through a Type Length Value, TLV, message transmitted between the portal and the opposite end.

16. A device for implementing bidirectional traffic on the same path in an aggregation group, located in a portal of an Link Aggregation Group, LAG, comprising:
a receiving unit, connected with a determining unit, and configured to receive indication information sent by an opposite end of the LAG, wherein the indication information carries port indexes of the opposite end and/or a traffic distribution method of the opposite end;
the determining unit, connected with the receiving unit, and configured to determine port indexes of the portal and/or traffic distribution method of the portal according to the indication information;
a distributing unit, connected with the determining unit, and configured to distribute traffic according to the determined port indexes and/or traffic distribution method;
wherein the determining unit is further configured to set, in a case that the port index of the opposite end carried in the indication information are inconsistent with the port indexes of the portal, the port indexes of the portal according to the priority of the portal and the priority of the opposite end or a master-slave relation with the opposite end.

17. The device according to claim 16, wherein the determining unit is further configured to set the port indexes of the portal and/or the traffic distribution method of the portal to be consistent with the port index of the opposite end and/or the traffic distribution method selected by the opposite end and carried in the received indication information.

18. A device for implementing bidirectional traffic on the same path in an aggregation group, located in a portal of an Link Aggregation Group (LAG) comprising:

a sending unit, configured to send indication information to an opposite end of the LAG, wherein the indication information carries port indexes of the local end and/or a traffic distribution method of the opposite end; and the indication information is used for determining, for the opposite end, port indexes of the opposite end and/or the traffic distribution method of the opposite end;

a distributing unit, configured to distribute traffic with the opposite end;

wherein when the port indexes of the portal carried in the indication information are inconsistent with the port indexes of the opposite end, setting, by the opposite end, the port indexes of the opposite end according to priorities of the portal and the opposite end or a master-slave relation between the portal and the opposite end.

* * * * *